(No Model.) 2 Sheets—Sheet 2.
P. F. COX.
BELT MAKING MACHINE.
No. 600,359. Patented Mar. 8, 1898.
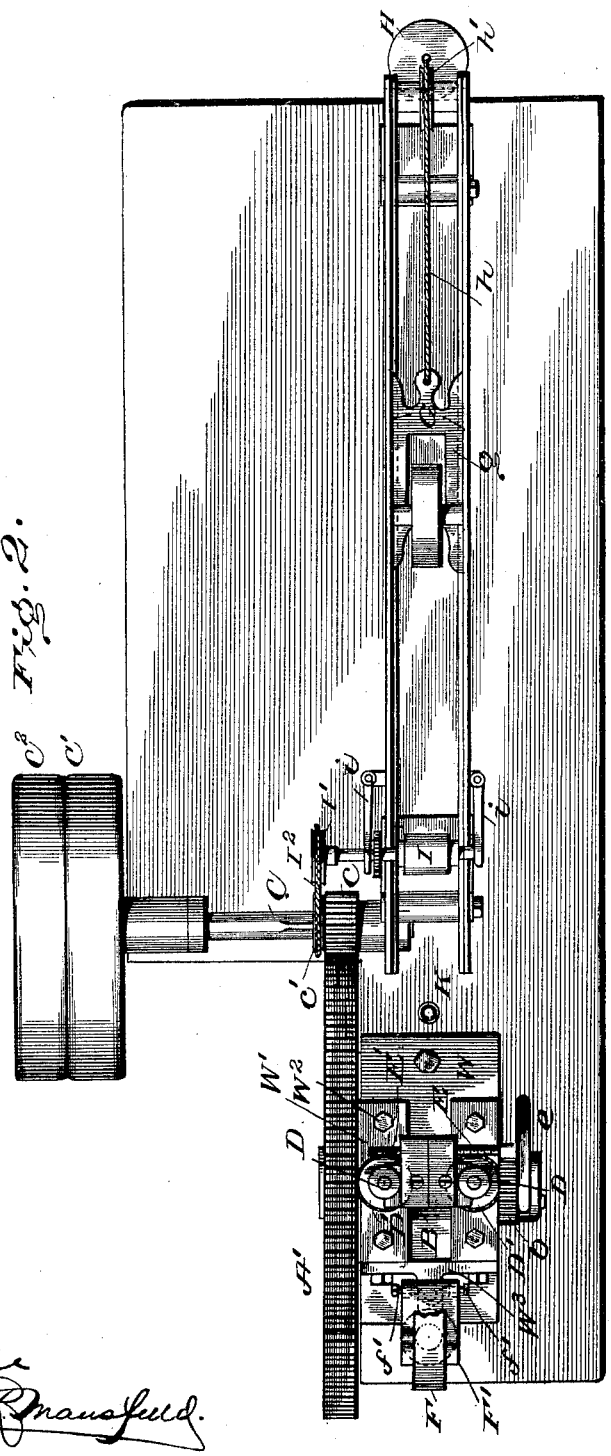
Witnesses
Jno. [illegible]
James R. Mansfield.
Inventor
Paul F. Cox
by
Alexander [illegible]
his Attorneys

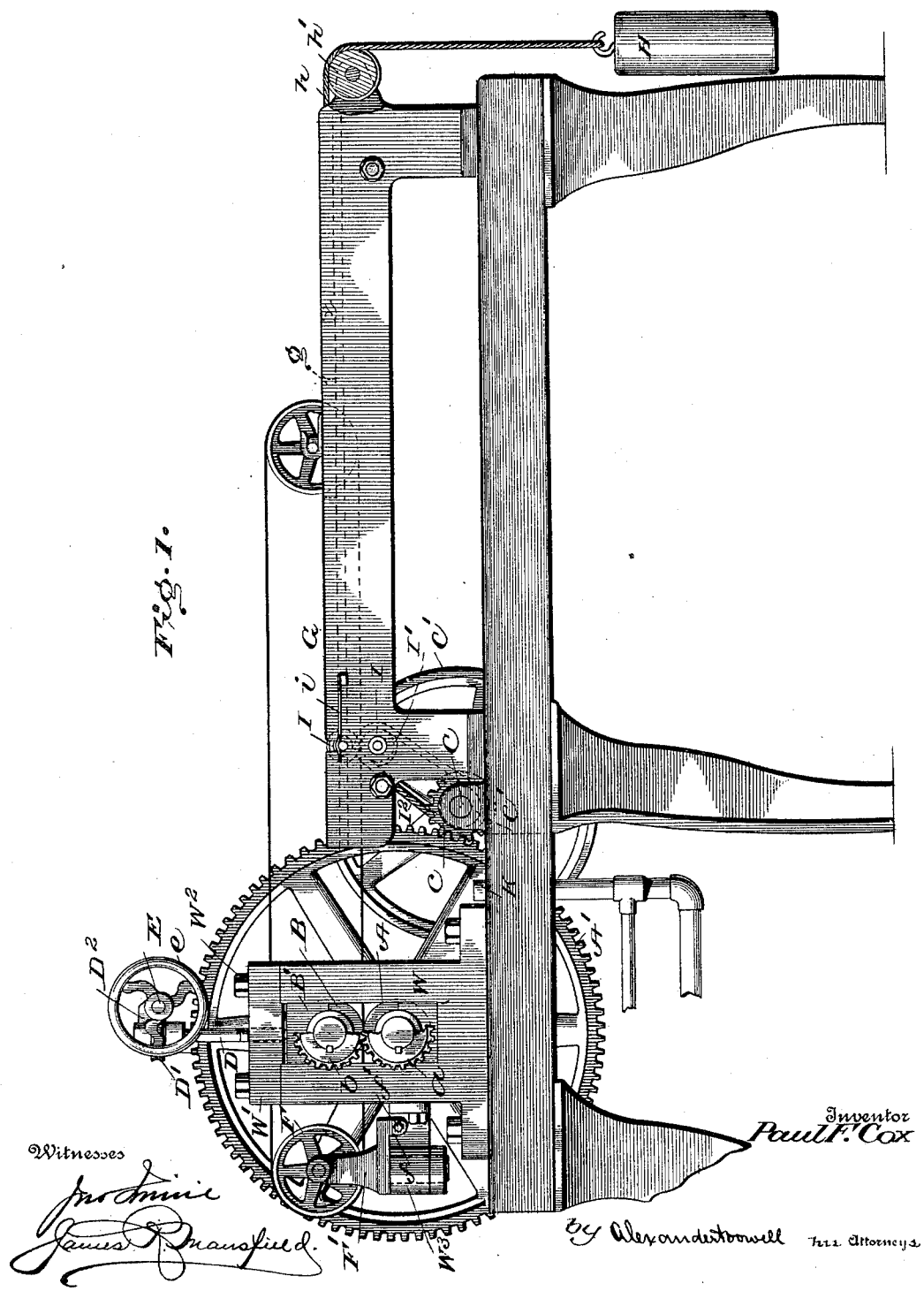

UNITED STATES PATENT OFFICE.

PAUL FLEMMING COX, OF CHICAGO, ILLINOIS, ASSIGNOR TO THE COX TYPE SETTING MACHINE COMPANY, OF SAME PLACE.

BELT-MAKING MACHINE.

SPECIFICATION forming part of Letters Patent No. 600,359, dated March 8, 1898.

Application filed June 21, 1897. Serial No. 641,651. (No model.)

*To all whom it may concern:*

Be it known that I, PAUL FLEMMING COX, of Chicago, in the county of Cook and State of Illinois, have invented certain new and useful Improvements in Belt-Making Machines; and I hereby declare that the following is a full, clear, and exact description thereof, reference being had to the accompanying drawings, which form part of this specification.

This invention is an improved metal belt, a process of, and apparatus for making same, and will be fully understood from the following description, taken in connection with the drawings forming part of this specification.

The object of the invention is to produce a jointless, continuous, homogeneous, endless metal belt; and it is especially designed for the production of very thin, smooth, seamless, and jointless belts for use on type-setting machines to carry the types from the type-reservoir to the composing mechanism. After many attempts to procure practically useful and reliable belts for this purpose I found it heretofore impossible to procure them because they were liable to many imperfections, the principal being that of joints and seams made by welding the ends of a metal ribbon or strip together to make the endless belt. It was practically impossible to maintain such belts in proper condition for use. The joints were generally rough and thicker than the other portions of the belt, even when produced by electric welding processes, and when filed down and dressed as finely as possible would soon crack and roughen and break because of lack of homogeneity in the temper of the belt and joint, so that for years the manufacturers of type-setting machines have been seeking some substitute for metal belts or some form or make of metal belt which would be reliable. Because of my difficulties with this very class of machines and from this very cause I sought a remedy, and have finally discovered the belt and the process and apparatus for making the same which is the subject of the present application for patent and which I will now describe.

Referring to the accompanying drawings, Figure 1 is a side elevation of the apparatus for making belts. Fig. 2 is a top plan view thereof.

This is a machine for manufacturing endless metal belts, the product of which must be perfect and of a given length, width, and thickness. The length and thickness is determined by weighing the stock or ring of material before placing it in the machine to be rolled out. It is necessary to have complete control of the stock-ring from start to finish, and it is also necessary to be able to anneal the material of which the belt is being made at any time during the operation of the machine, inasmuch as the constant rolling to lengthen or stretch the material hardens the stock to such an extent that it would be useless if continually rolled to the length desired.

The belts can be made of any suitable material; but I preferably use copper because of its toughness and durability when run at a high speed as a belt.

A B designate a pair of reducing-rolls, the lower one being journaled in stationary bearings in guides W on the main frame and having on one end a large gear A', meshing with a pinion $c$ on a drive-shaft C, also journaled in suitable bearings on the main frame and carrying fast and loose pulleys C' $C^2$, on which the driving-belt is mounted. On the other end of the shaft of roll A is a pinion $a$, meshing with a pinion $b$ on the shaft of roll B, which latter roll is mounted in vertically-adjustable boxes B', of suitable construction, arranged in guides W.

D D are threaded shafts vertically above boxes B' and bearing thereagainst, being tapped through threaded openings in the cap-blocks W' on top of guides W and securely fastened thereto by bolts $W^2$. On the upper ends of rods D are fixed worm-gears D', and a casting $D^2$ is supported on the upper ends of the shafts, so as not to interfere with their rotation, however, and in said casting is journaled a horizontal worm-shaft E, having worms E', meshing with gears D', as shown, and on one end of shaft E is a hand-wheel $e$, by which it can be rotated.

At the outer side of rolls A B is a guide-pulley F, journaled in a bracket F', swiveled on a bracket $W^3$, bolted to the side of guides W. Bracket F' is provided with depending lugs $f f$, loosely embracing bracket $W^3$, and bolts $f'$ are tapped through lugs $f$, so as to enable the guide-roller E to be adjusted slightly relatively to alinement with rolls A B. At the opposite side of rolls A B and in about the same plane as the meeting-line thereof is a horizontal guideway G, on which is a movable carrier $g$. To this carrier is fastened a rope $h$, running back over a sheave $h'$ at the rear end of the guideway and fastened to a weight H.

Near to rolls A B and suitably journaled in the guideway-frame are a pair of brushing or polishing rolls I I, the lowermost roll having a pulley $I'$ on one end of its shaft, driven by a belt $I^2$ from a pulley $c'$ on shaft C, as shown. The upper roller I is pressed toward the lower roll by springs $i$, as indicated in the drawings, said springs being pivoted, so that they can be turned aside and the upper roller removed when a belt is to be put in place. The rolls I keep the surface of the belt bright and clean, so that it is not marred by incrustations during the rolling process.

Between rolls A B and I I and below the planes thereof is a Bunsen burner K, provided with suitable air and gas supply pipes; but any suitable form of burner may be employed.

The belts are produced by rolling them out of rings of metal, preferably copper, as aforesaid, or like ductile tough metal. The rings may be turned carefully from seamless tubing or from forgings, but should be carefully dressed down to proper form and size before placing them in the machine. As an example, for making a copper belt ninety-seven inches long and one and one-eighth inch wide I use a ring one and three thirty-seconds wide and about three thirty-seconds thick, weighing three and three-fourths ounces. Of course the proportions of the stock-ring will be varied according to the thickness and weight of belt to be produced. These rings are placed between rolls A B—that is, one roll is detached and slipped through the ring and then replaced, so that the rolls bite one side of the ring between them, the ring encircling one roll freely. After the stock-ring is placed in the machine to be rolled and the power applied the operator turns the hand-wheel $e$, which is connected to the worms E, that control the compression-screws D, to bring the rolls A B closer together, and necessarily the stock-ring yields to the rigidity of the rolls and lengthens or enlarges. After the stock-ring has been enlarged sufficiently to place around the guide-pulley F and the tension-pulley $g$ the tension-weight H is brought into play and gradually and accurately takes up the slack produced by the yielding or expansion of the stock-ring. While the machine is in operation the operator, observing that the metal is becoming hard and stubborn, turns on the annealing-flame at K, which enables him to control the temper of the metal and keep it continually annealed during the entire operation of making the belt. To avoid the collection of scale from the annealing process, which might, if allowed to pass through the rolls, ruin the belt, the sweeping rolls or brushes I I are brought into play and keep the belt free of all dirt. This is necessary, as the belt when rolled very thin (as I desire) would be otherwise full of kinks, rendering it useless when completed. The operator continues screwing down the shafts D as the machine is in operation until the tension-roller $g$ travels far enough to show the proper length of the belt.

By this combination I am enabled to produce an endless belt which is accurate in thickness and of any length desired. Other belts of the same thickness and material have proved impractical, as the stock, being so thin, $(.005'',)$ would not permit of welding and a brazed joint is too short-lived.

Belts made from endless stock by this process have proved practical, as there are no connected ends and no liability of parting from that cause.

The rings from which the belts are rolled can be placed in the machine by removing the upper roll $B'$ after taking off the cap-pieces $W'$, the ring then being placed in position around roll $B'$, which is then replaced and the caps screwed down. Obviously the construction may be easily modified so as to admit of placing the rings and removing the belts more readily.

The pulley F is made adjustable, as described, because it was found that the belts while being stretched had a tendency to shift from one end of the rolls to the other, which makes them crooked. By using the swiveled pulley F the belt can be guided so as to keep it in the center of rolls. I tried straight guides at sides of belt, but found that the rolls crowded the belt against these guides so hard that its edges would curl, rendering it useless.

The annealing need not be continuous; but the metal of the belt should not be allowed to get hard and when finished should have a slight spring-temper.

Having thus described my invention, what I therefore claim as new, and desire to secure by Letters Patent thereon, is—

1. In a machine for making endless, jointless metal belts from metal rings, the combination of a pair of rolls, means for adjusting their relation to each other; a swiveled guide-pulley for the expanded ring or belt for keeping it in proper position between the flatting-rolls without crowding its edges; means for adjusting said swiveled pulley; and a tension guide-pulley for the belt adapted to maintain the tension thereof during its expansion, substantially as described.

2. In a machine for making jointless metal belts from rings, the combination of the expanding-rolls, means for adjusting one in relation to the other, substantially as described, the stationary and adjustable guide-rollers, and means for annealing the belts during the process of expansion or rolling thereof, all substantially as and for the purpose set forth.

3. In a machine for making jointless metal belts from rings, the combination of the expanding-rolls, means for adjusting one in relation to the other, substantially as described, the stationary and adjustable guide-rollers, and means for annealing the belts during the process of expansion or rolling thereof, and means for polishing the belt during its expansion, all substantially as and for the purpose described.

4. In a machine for making endless, jointless, metal belts from metal rings, the combination of the expanding-rolls for rolling the belt; the swiveled adjustable guide-roller, and the tensioning guide-roller for guiding the expanding belt, and the polishing-rolls adapted to clean the belt as it is rolled or expanded, all substantially as and for the purpose set forth.

In testimony that I claim the foregoing as my own I affix my signature in presence of two witnesses.

PAUL FLEMMING COX.

In presence of—
ORVILLE D. ORTON,
JAMES A. WOOD.